(Model.)

J. HOMER.
Watch Chain Swivel.

No. 238,391. Patented March 1, 1881.

WITNESSES:
Joseph A. Miller Jr
Wm L. Coop

INVENTOR:
Joseph Homer
by Joseph A. Miller
Atty

UNITED STATES PATENT OFFICE.

JOSEPH HOMER, OF PROVIDENCE, RHODE ISLAND.

WATCH-CHAIN SWIVEL.

SPECIFICATION forming part of Letters Patent No. 238,391, dated March 1, 1881.

Application filed November 2, 1880. (Model.)

*To all whom it may concern:*

Be it known that I, JOSEPH HOMER, of the city and county of Providence, and State of Rhode Island, have invented a new and useful Improvement in Watch-Chain Swivels; and I hereby declare that the following is a full, clear, and exact description of the same, reference being had to the accompanying drawings, forming part of this specification.

This invention has reference to an improvement in the hook or loop of a watch-chain swivel, and has for its object simplicity of construction and greater security.

The invention consists in a watch-swivel comprising a spring-hook provided with a catch on one end to engage the sleeve of the swivel, and a locking device to retain said catch in such engagement.

Figure 1:
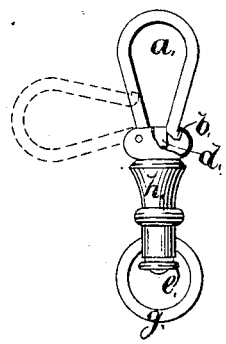
Figure 2:
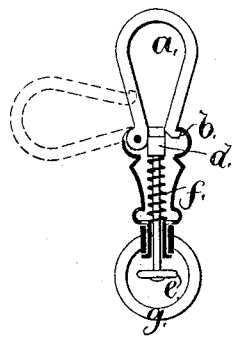

Figure 1 is a view, partly in section, of a watch-chain swivel, showing a spring-hook hinged to the swivel, in solid lines when in the closed position, and in broken lines when open. Fig. 2 is a sectional view of the same, showing the spring-pressed bolt by which the loop is locked in the closed position.

In the drawings, $a$ is a spring-hook, provided at its end with a catch, $b$, which enters under a projecting lip on the swivel, and firmly holds the hook in the closed position. In the drawings the hook is shown hinged to the swivel. It is opened by pressing on the end of the hook, releasing the catch, and turning the hook on its hinge into the position shown in broken lines.

To lock the hook so as to form an absolute safety-hook that can only be opened by two combined motions, which cannot take place accidentally, I place into the stem of the swivel the bolt $d$, provided within the ring $g$ with the cap or head $e$, and surrounded by the coiled spring $f$. This bolt, when in place, prevents the hook from being compressed so as to release the catch $b$; but when drawn upward the hook can be compressed and the catch released. These swivels require no soldering in their construction, and as no heat is applied the hooks retain the hardness and springiness of the metal, as well as the finish and polish, requiring no repolishing after they are put together.

Having thus described my invention, I claim as new and desire to secure by Letters Patent—

In a watch-chain swivel, the hook $a$, made as a spring, its catch $b$, to engage the stem of the swivel, and a locking-bolt, $d$, to press and lock said hook within the stem, combined substantially as shown and described.

JOSEPH HOMER.

Witnesses:
J. A. MILLER, Jr.,
JOSEPH A. MILLER.